Aug. 6, 1935.        A. G. OGDEN        2,010,561
PHOTOGRAPHIC LETTERING MACHINE
Original Filed Oct. 22, 1928    8 Sheets-Sheet 1

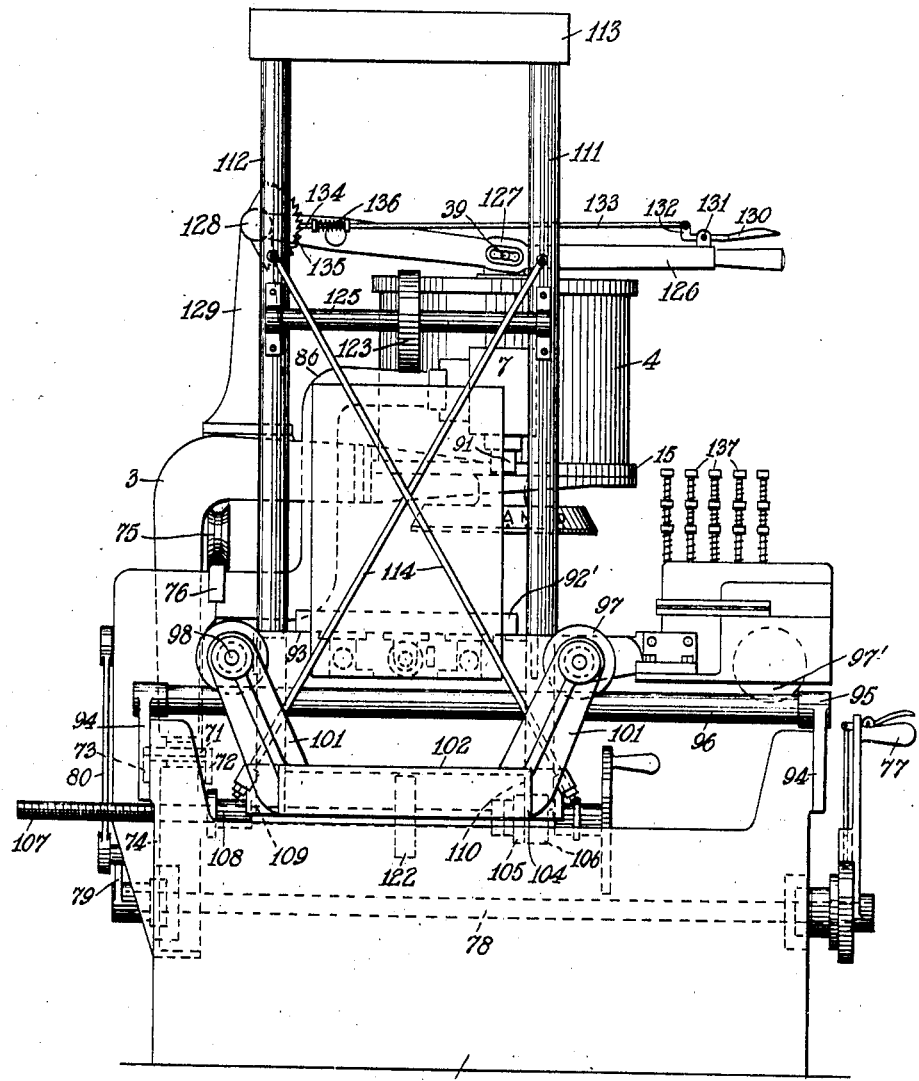

Aug. 6, 1935. A. G. OGDEN 2,010,561
PHOTOGRAPHIC LETTERING MACHINE
Original Filed Oct. 22, 1928    8 Sheets-Sheet 3
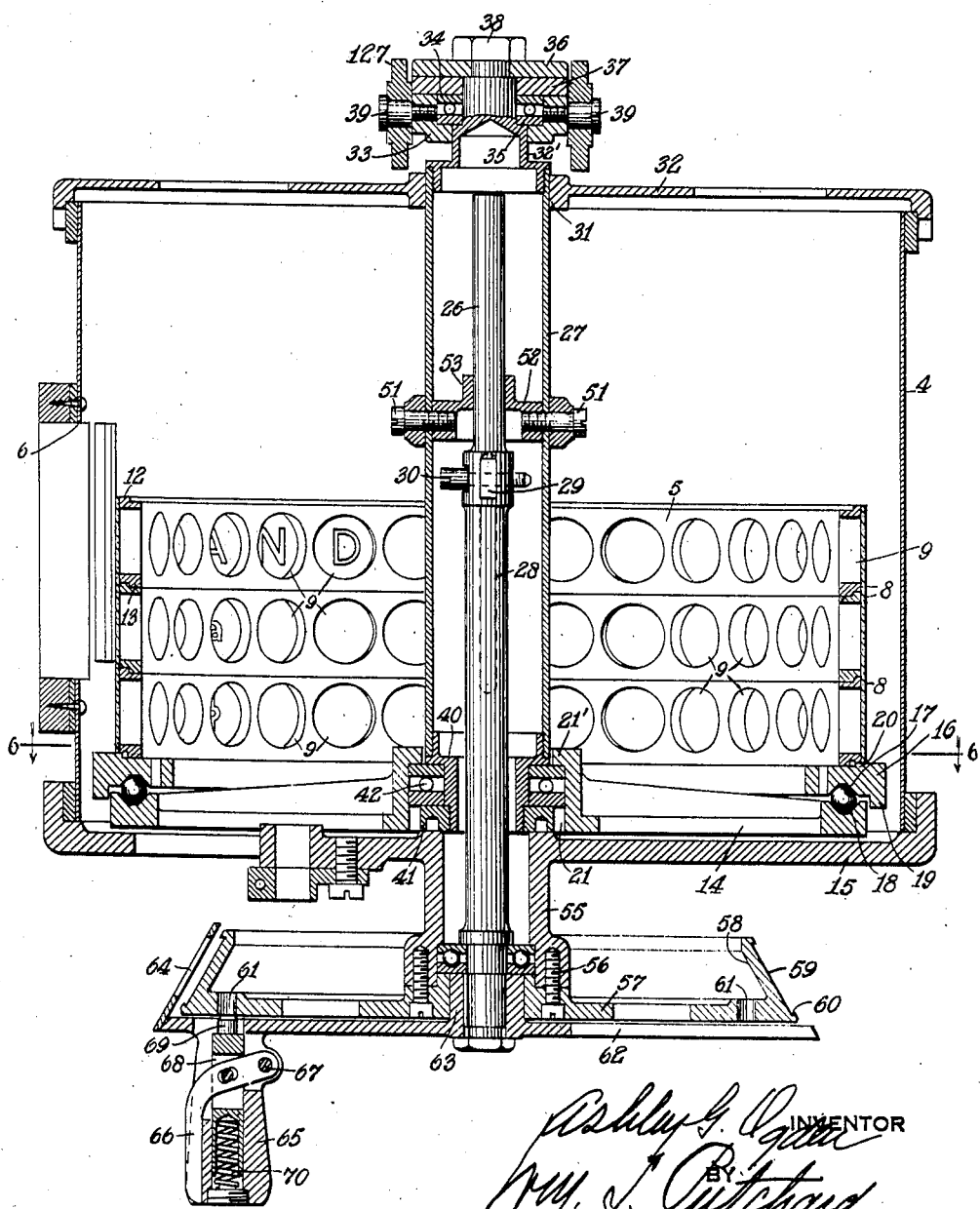

Aug. 6, 1935.  A. G. OGDEN  2,010,561
PHOTOGRAPHIC LETTERING MACHINE
Original Filed Oct. 22, 1928  8 Sheets-Sheet 4
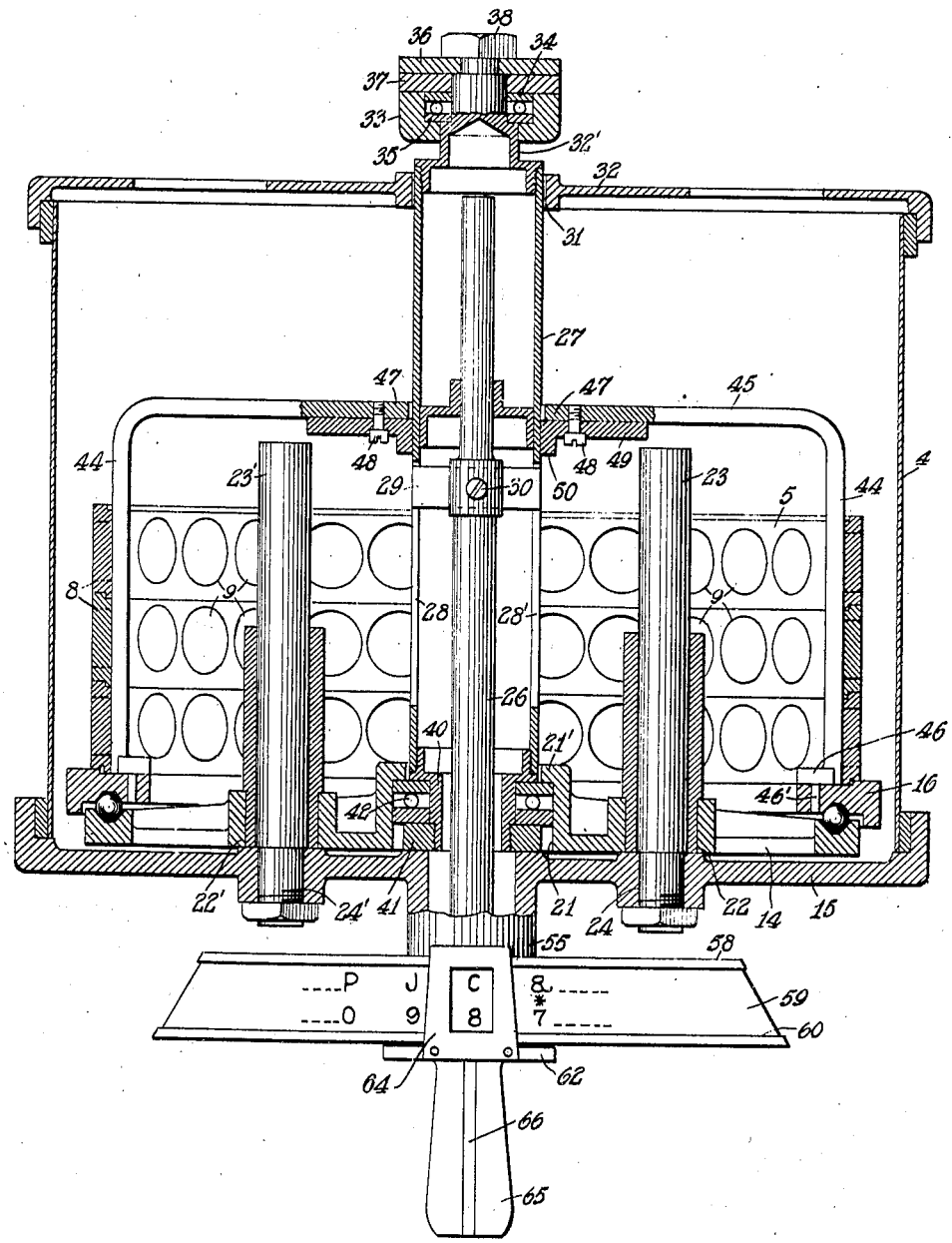

Aug. 6, 1935.     A. G. OGDEN     2,010,561
PHOTOGRAPHIC LETTERING MACHINE
Original Filed Oct. 22, 1928    8 Sheets-Sheet 5

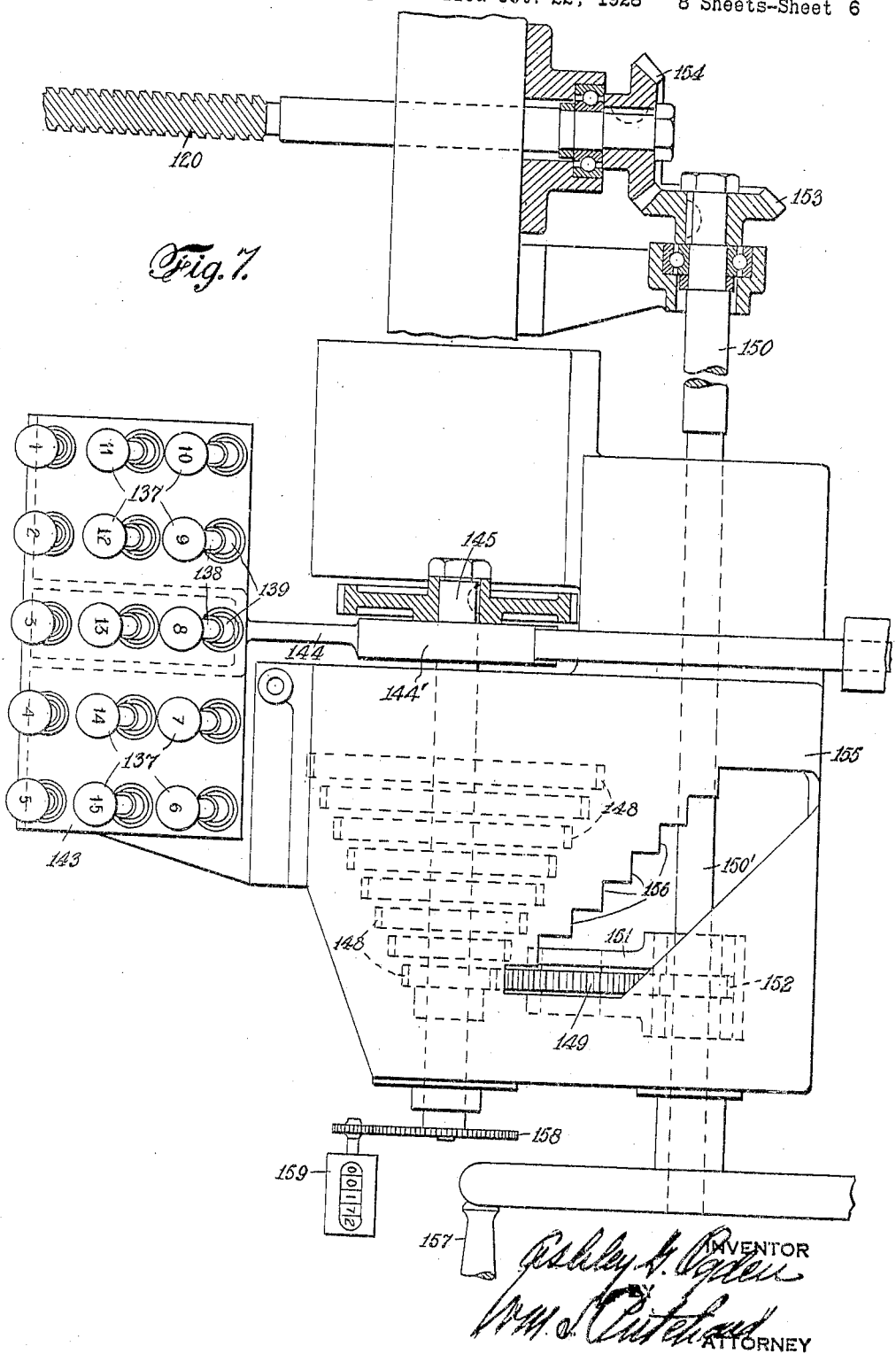

Aug. 6, 1935.  A. G. OGDEN  2,010,561
PHOTOGRAPHIC LETTERING MACHINE
Original Filed Oct. 22, 1928   8 Sheets-Sheet 7.

Aug. 6, 1935.  A. G. OGDEN  2,010,561
PHOTOGRAPHIC LETTERING MACHINE
Original Filed Oct. 22, 1928    8 Sheets-Sheet 8
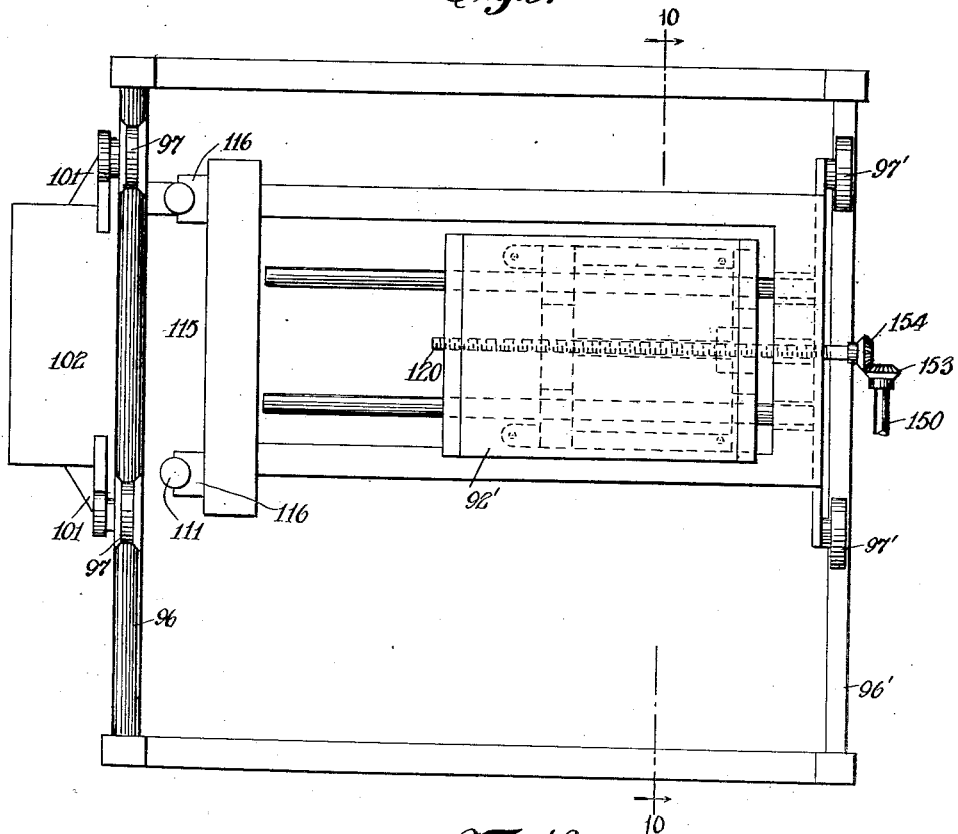
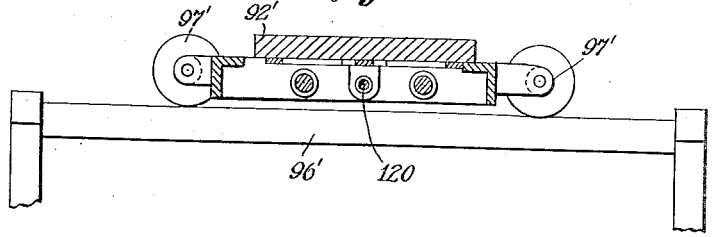

Patented Aug. 6, 1935

2,010,561

UNITED STATES PATENT OFFICE 2,010,561

PHOTOGRAPHIC LETTERING MACHINE

Ashley G. Ogden, Baltimore, Md., assignor to General Printing Ink Corporation, New York, N. Y., a corporation of Delaware Application October 22, 1928, Serial No. 313,984
Renewed January 17, 1935

10 Claims. (Cl. 95—4.5)

This invention relates to a photographic lettering machine and more particularly to a photographic lettering machine wherein images of characters are selectively and/or alternately exposed to view and onto a sensitized surface.

In photographic composing prior to this invention, the composition was unable to be inspected during preparation and it was impossible to discover whether an error had been made until the finished composition was examined. Ofttimes a single error would necessitate the redrafting of the entire composition. This is, of course, greatly undesirable, time-consuming and expensive.

I have found that I can overcome the above defect by selectively exposing to view and/or registering with a predetermined layout the image of each character and preferably prior to exposure on a sensitized surface whereby the composition during preparation may be checked and errors avoided.

It is, therefore, an object of this invention to provide an apparatus to selectively and alternately expose images of selected characters to view and onto a sensitized surface.

Another object of this invention is to provide an apparatus comprising a plurality of means carrying various types of master characters whereby any type of character may be used in the machine without changing any parts of the machine.

Another object of this invention is to provide an apparatus wherein a letter or character is exposed to view and/or registered with a predetermined layout and onto the sensitized surface from the same means or subject.

Another object of this invention is to provide an apparatus whereby images of selected characters are separately and selectively projected to view and/or registered with a predetermined layout and on a sensitized plate from the same means, the images both reading right and registering with each other, both surfaces receiving the images traveling in the same direction.

Further objects will appear from the following description, appended claims and the accompanying drawings forming part of this specification, and in which Figure 1 is a front elevation with parts omitted, of the machine constituting my invention.

Figure 2 is an end view of Figure 1.

Figure 3 is a sectional view of the drum and selector, showing the letter-carrying means and means for rotating said selector and said letter-carrying means.

Figure 4 is a vertical sectional view of the letter-carrying means and drum in which the dials are contained.

Figure 7 is a plan view of the key-board spacing mechanism and its cooperating parts.

Figure 9 is a top plan view of the layout table and associated structure.

Figure 10 is a section taken on line 9—9 of Figure 9.

Figure 1:
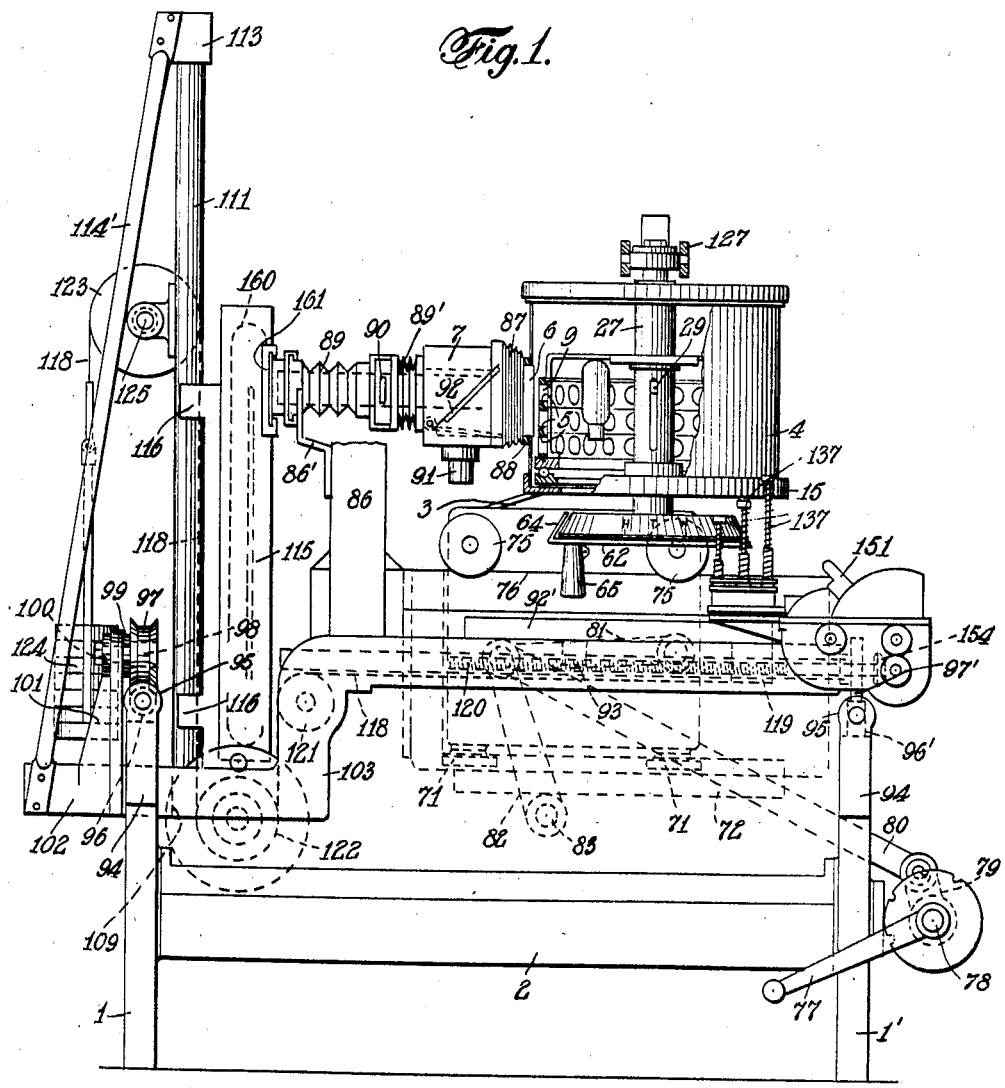
Figure 6:
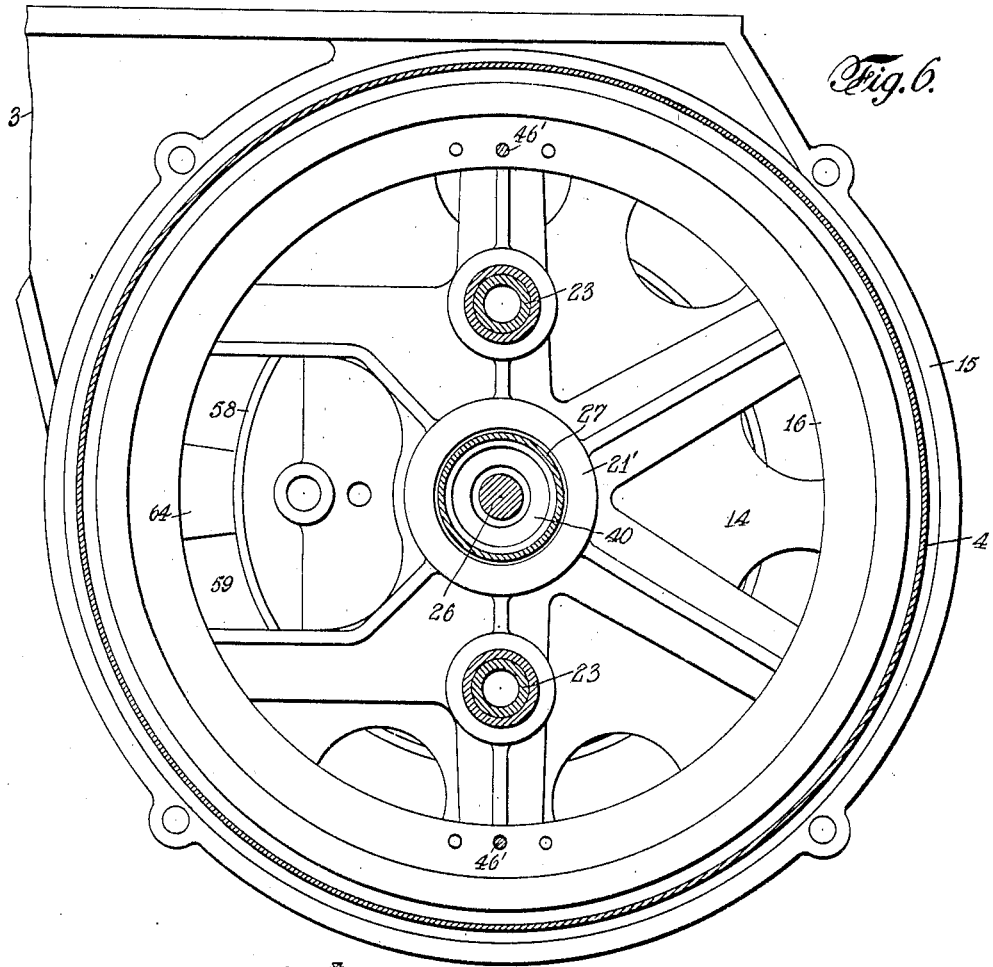
Figure 6 is a view taken on line 6—6 of Figure 3.
Figure 5:
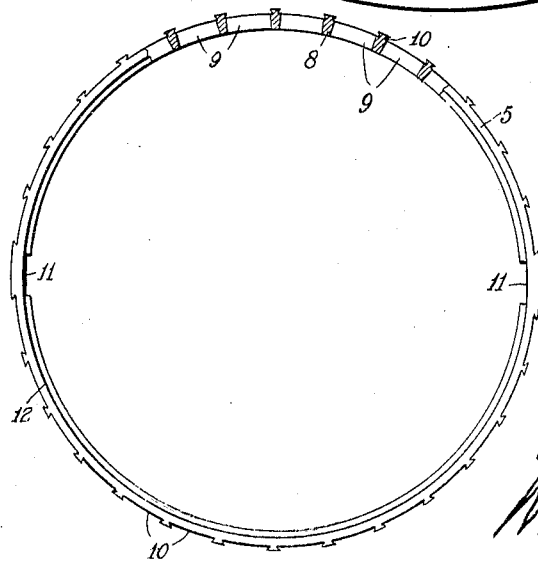
Figure 5 is a plan view of one of the dials.

The invention, as above stated, consists broadly in selectively and alternately exposing to view preferably onto some surface, such as a layout table, images of the characters forming part of the composition and preferably prior to exposure onto a sensitized surface, whereby the composition may be checked and registered with a predetermined layout during its preparation, thus minimizing errors. The apparatus which I have devised comprises means provided with master characters such as a dial or plurality of dials having the master characters mounted on their peripheries, means for bringing any master character into position for exposure, a projection device having means whereby the selected character may be exposed into view as on a layout table and/or registered with a predetermined layout and onto a sensitized medium. The mechanism including the means carrying the master characters, layout table and frame for supporting the photographic plate are movably mounted, whereby predetermined sizes of the characters and proper spacing between the characters, words and sentences may be obtained.

Referring now to the drawings wherein like reference numerals designate like parts, the reference numerals 1 and 1' designate uprights and the reference numerals 2 and 2' designate crosspieces, said uprights and cross-pieces constituting a frame on which the mechanism comprising the invention is mounted.

Mounted on the frame, in a manner more particularly described hereafter, is a bracket 3 carrying a drum 4 on which are mounted dials 5 carrying the master characters. The drum 4 is provided with an opening 6 through which the selected character brought into proper position is projected by a lamp 7' positioned within the drum onto a mirror 92 within the projecting device 7, by means of which it is exposed into view on a layout table where it may be made to register with a predetermined layout, sketched or otherwise indicated, and thence onto a photographic plate. By various mechanism, hereafter described, the characters comprising the composition are successively and selectively brought into projecting position and the lenses, photographic plate, layout table and dials moved, whereby proper size, location and spacing of characters, words or lines are obtained.

The dials 5 comprise rings 8 having openings 9 formed therein. Adjacent the openings 9, the ring is provided with milled slots 10 wherein the positive or negative of the letter or character is placed. On the inner periphery of the rings 8 and diametrically opposed are two keys or slots 11, the function of which will soon become apparent. The rings 8 are also provided with flanges 12 and 13 whereby a plurality of said rings may be mounted and fitted on one another, as illustrated in Figures 1, 3 and 4.

A plurality of dials 5, each dial provided with a master character, are mounted on an elevator 14 disposed within the drum 4 and adjacent the bottom 15 thereof. Disposed between the elevator 14 and the dial adjacent thereto is a base ring 16. In its bottom face, the base ring 16 has a ball-race 17 adapted to cooperate with a ball-race 18 formed in the upper surface and adjacent the outer periphery of the elevator 14 thus forming a ball bearing. The base ring 16 is also provided on its bottom with a flange 19 which overlaps the end of the ball-race of the elevator 14. On its top surface the base ring 16 has a flange 20 which is adapted to engage the lower flange 12 of the dial 5 to form a close fit. The elevator 14 is provided with three bores 21, 22 and 22'. Through the bores 22 and 22' extend vertical guides 23 and 23', respectively, fastened in openings 24 and 24' in the bottom 15 of the drum 4 and over which the elevator 14 is adapted to slide. Through the central bore 21 passes a shaft 26 on which the elevator is loosely and non-rotatably mounted.

Surrounding or encasing the shaft 26 is a tubular shaft 27 having slots 28 and 28' formed therein. A feather 29 securely fastened by any suitable means, such as a set-screw 30, to the shaft 26 extends into the slots 28 and 28'. By this means rotation of the shaft 26 is imparted to the tubular shaft 27. The tubular shaft 27 extends through a bore 31 in the top 32 of the drum 4. Screwed to the top of the tubular shaft 27 is a cap 32' carrying a flanged member 33 in which two annular ball bearing races 34 and 35 are disposed. A plate 36 disposed on a disk 37 securely locks this arrangement of parts by means of a screw 38. Screws 39 are adapted to carry a bifurcated member of a handle for purposes hereafter described.

The lower end of the tubular member 27 terminates adjacent a flange 21' extending inwardly on the wall of the bore 21 of the elevator 14, and a sleeve 40 is screwed into this end of the tubular shaft 27. On the lower extremity of the sleeve 40 an annular ring 41 is screwed which together with the side walls of sleeve 40 and bore 21 form a space in which ball-bearing races 42 are disposed. Due to this construction the elevator 14 though supported by elements connected to the tubular shaft 27 is not rotated thereby.

By means of the feather 29 operating in slots 28 and 28' the rotation of the shaft is transmitted to tubular shaft 27 which, in turn, transmits it to the dials 5. The latter result is obtained by having the vertical members 44 of the swinging arm 45 fit in and engage the slots or keyways 11 of the dials 5. Each of the lower ends of the vertical members 44 has a foot 46 provided with dowels 46' registering with holes in the base ring 16. The other end 47 of the swinging arm 45 is fastened by means of a screw 48 to a flange 49 of the sleeve 50 mounted on the tubular member 27. The sleeve 50 is fastened by means of screws 51 to a hollow member 52 within the tubular shaft 27. The member 52 is formed with a sleeve or journal 53 which functions as a bearing for the shaft 26.

The bottom 15 of the drum 4 is provided at its central opening with a depending portion 55 to which is secured, by screws 56, a disk 57. The disk 57 is formed on its periphery with an upstanding frustrum conical ring 58 having a channel 59 whose edges have milled slots 60 and are adapted to receive the characters corresponding to those mounted on the dials 5. The disk 57 is also provided with a series of holes 61 adjacent or opposite to each letter or character.

Beneath the disk 57 is a plate 62, which through a sleeve 63 in the center thereof, is positioned and rotatively secured on the shaft 26. The plate 62 carries on its periphery an indicator or pointer 64 adapted to indicate any letter on the frustrum conical ring 58. At any suitable point, a handle 65 is secured to the plate 62 in any suitable manner. This handle comprises a lever 66 pivotally mounted on a pin 67 and adapted upon the application of pressure, to move downwardly a link 68 carrying a pin 69 adapted to enter the holes 61 in a disk 57. A spring 70 mounted within the handle normally urges the link 68 together with the pin 69 forward into the holes 61 whereby the mechanism is locked. In Figure 3, the handle mechanism is illustrated as being ready to be rotated; that is, the pin 69 is withdrawn from the hole 61.

The characters mounted on the disk 57 are so arranged that when the indicator designates any letter the corresponding letter on the dial 5, which is being used in the preparation of the composition, will be brought into projecting position. In operation, the pin 69 is withdrawn from the hole 61 and the plate 62 rotated until the indicator is opposite the desired letter. The handle is then released whereby the pin 69 enters the hole 61 and locks the mechanism preventing movement of the dials. The rotation of the plate 62 is transmitted to shaft 26 which, through the feather 29 operating in slots 28, 28', transmits the rotation to the tubular shaft 27. The rotation of the tubular shaft 27 is then transmitted by the swinging arms 45 to the dials 5. It is to be noted that no rotation is transmitted to the elevator 14.

In the drawings, I have illustrated a plurality of dials 5. Each of these dials 5 carries a different type of character and the one to be used is adjusted into proper position with relation to the projecting mechanism by raising or lowering of the tubular shaft, as hereinafter described, whereby the elevator 14 carrying the dials is raised or lowered without necessitating any change or changes in the structural elements or arrangement thereof.

The drum 4, as previously mentioned, is fastened on a bracket 3 which is adapted to be moved, whereby the proper size (enlarged or reduced) of the letters or characters may be obtained. To attain this result, the bracket 3 in one end thereof has rollers 71 mounted in a horizontal plane and adapted to engage a channel formed by the members 72 and 73 secured to an angle iron 74 mounted between the uprights 1. The bracket is also provided with rollers 75 adapted to ride on a track 76. Movement caused by the rotation of the handle 77 is transmitted through shaft 78 and links 79, 80 and 81 to the bracket whereby the rollers 71 and 75 are moved over their respective tracks. Due to the link 82, which is fixed at 83, link 81, and therefore the bracket, is given a movement limited by the movement of the link 82. It is, of course, obvious that any length of movement may be obtained by proper relation or size of the links. The handle 77 is provided with a locking mechanism of any of the usual types, whereby rotation thereof is prevented when not desired.

The camera 7, mounted on a bracket 86 (see Figure 2) carried by the frame in any suitable manner, is disposed adjacent the drum 4 and connected thereto by bellows 87, one end of which is secured by an adhesive or other suitable means to a frame 88 surrounding the opening in the drum. Another bellows 89 is rigidly positioned adjacent the photographic plate by means of an arm 86' secured to the shutter frame carrying the shutter 161. Between the bellows 89 and the camera 7 there are positioned the bellows 89' and a lens 90 having a movable camera shutter. A lens 91 is positioned in the bottom of the camera. By means of vertical curtain 160, the horizontal shutter curtain 161 disposed in the bellows 89 and the lens shutter 90, the plate is protected from light. In the interior of the camera 7, a shutter 92 having a reflecting surface is pivotally mounted and its edges so disposed within the casing that the camera is light tight. When the shutter 92 occupies the position illustrated by the full lines in Figure 1, the character from the dial in projecting will be projected thereon, whereby it will be reflected through the lens 91 onto a layout table 92' where it may be registered with a predetermined layout, sketched or otherwise noted or indicated. By movement of a lever (not shown) the shutter 92 is then moved into the position indicated by the dotted lines, whereby the letter or character is projected through the lens 90 and exposed on the photographic plate and photographed. By the arrangement of the lens, I am able to make the letters on the photographic plate and on the layout table read in the same direction. It is, of course, understood that instead of lenses various other reflecting materials may be used.

The layout table 92' is mounted on a carriage 93 adapted to be moved transversely relative to the camera whereby proper spacing between lines forming the composition may be obtained. Movement is imparted to the carriage by mechanism described immediately hereafter.

The uprights 1 are formed with members 94 having bosses 95 which are adapted to receive a curved track 96. Similarly, the uprights 1' are provided with a track 96'. Grooved or flanged rollers 97 mounted on the shafts 98 are adapted to ride over the track 96. A boss 99 mounted on a reduced portion 100 of the shaft 98 carries ribbed arms 101 formed integrally with a portion 102 constituting the lower portion of the carriage. The upper part of the carriage is connected to the lower portion by means of the arms 103 and at the opposite end thereof carries the plain rollers 97' adapted to ride or travel over the track 96'. The end 104 of the lower portion of the carriage is secured between the members 105 and 106 of a mechanism for rotating screw 107, which passes through a stationary nut 108, whereby rotation of the screw 107 will move the carriage. The mechanism to which the carriage is attached may be provided with a vernier attachment, whereby the movement of the carriage may be accurately measured.

The lower portion of the carriage 102 is formed with two bores 109 and 110 in which are mounted uprights 111 and 112, respectively. At their upper extremities these uprights are connected together by cross-pieces 113, thus forming a frame which constitutes a support for the plate holder. Rods or bars 114 extending adjacent the lower ends of the uprights and fastened at some suitable point to the uprights form reinforcing members. Another brace 114' extends from the end of the lower portion of the carriage 102 to the cross-piece 113.

The plate holder 115 comprises a frame which has lugs 116 embracing the uprights whereby said plate holder may be guided up and down. Instead of the lugs 116 embracing the uprights, the lugs may be formed so that they will ride in slots in the uprights. Since the frame and plate holder 115 are mounted on the arm 103, any movement given to the carriage will also be given to the support 111.

In order to synchronize the movement of the layout table between characters with the vertical photographic plate, I secure a metal tape or cable 118 to a nut 119 fastened to the layout table and operated on a screw 120. The metal tape 118 passes over and under the sheaves 121, 122 and 123 and has attached to its end a counterweight 124. The sheave 123 is supported on a shaft 125 carried in the bearings fastened on the uprights 111 and 112. The metal tape 118 is secured to the plate holder in any suitable manner and by this means any horizontal movement (in Figure 1) of the layout table is transmitted to the plate holder which is moved in a vertical direction.

To raise and lower the various dials 5 into position in the drum 4, I provide a lever 126 having a bifurcated portion 127, which is adapted to be connected to the elements secured to the top of the tubular shaft 27 by the screws 39. The lever is pivotally mounted at 128 on the bracket 129. Mounted on the lever 126 and adjacent the handle portion, is a bell-crank lever 130 pivoted at 131 to said lever, its right angle extension 132 having a push rod 133 pivotally connected therewith. At its outer end the push rod 133 carries a pawl 134 which cooperates with a segment 135 fixedly mounted upon the bracket 129. A spring 136 surrounds the push rod and maintains the pawl 134 in engagement with the segment. Accordingly, when the lever 126 is raised and the lever 130 depressed, the pawl 134 disengages itself from the segment 135 which it engages. Upon the desired raising or lowering of the dials, the lever 130 is released and the pawl 134 engages the segment, whereby the elevator and dials are locked in the desired position.

It is, of course, well known that different characters such as letters of the alphabet have various widths. These widths are measured in 15ths, that is to say, that the widest letter, namely, "W" is 15/15 and the other letters various multiples thereof. After I have exposed one letter, it is necessary that the plate holder and layout board be moved a distance corresponding to the width of the next letter or a distance equal to the width of the space between the words. For this purpose, I provide a key-board-like arrangement of keys 137, fifteen in number, and each key designating some multiple of 15ths, from 1/15 to 15/15, and so indicated. Each key comprises a member 138 having a reduced portion thereof slidably mounted in a tube 139. The upper extremity of the tube 139 functions as a stop and is adapted to limit the depression of the member 138. Each tube 139 is made of such length that the portions thereof functioning as stops are so disposed as to permit a movement of mechanism (to be described) which moves the layout table and plate holder a distance in 15ths corresponding to the letter designated by the key depressed. By means of springs 140 the keys 137 and the stop members 139 are maintained in their proper normal position. The key members are provided with fixed swivel or ball joints 141 operating in the holes 142 of a plate 143. The ends of the keys terminate adjacent a bell-crank lever 144 loosely mounted on a shaft 145. Upon depression of one of the keys 137 the end thereof engages one arm 144 of bell-crank lever 144' and forces it as far as permitted; that is, until the stop 139 prevents further movement. The other arm of the bell-crank lever 144 carries a pivotally mounted pawl 146 normally in engagement with a ratchet 147 fixed on the shaft 145 whereby rotation is imparted to said shaft.

The rotation of shaft 145 is transmitted through any suitable speed reducing mechanism to screw 120, which, as previously described, operates a nut whereby movement of the layout table 92' is obtained. Due to the arrangement of the metal tape, this movement is also transmitted to the plate holder. Various speed reducing mechanisms may be used for the transmittal of the rotation of shaft 145 to screw 120. The speed reducing mechanism which I have illustrated in the drawings (see Figures 7 and 8) comprises a plurality of gears 148 of different diameters carried on shaft 145. Rotation of shaft 145 causes rotation of the gears 148, which by means of an idler gear 149 carried in an arm 151 slidably mounted on shaft 150' and meshing with gear 152 fastened on said shaft is transmitted to shaft 150 from suitable gearing. The rotation of shaft 145 is transmitted to shaft 150, which in turn transmits the rotation to screw 120 through the bevel gears 153 and 154. The gears 148 are made of such sizes that any one thereof cooperating with the idler gear 149 represents a certain predetermined movement of the layout table 92'. By raising and sliding arm 152 on shaft 150, the idler gear 149 together with gear 152 may be made to cooperate with any one of the gears 148 whereby the layout table 92' and plate holder 115 may be moved any desired distance. In the upper portion 155 of the housing are notches 156 in which the arm 151 is adapted to be received and held in position when cooperating with any of the gears 148 disposed opposite thereto. A handle 157 may be mounted on one end of the shaft 150 by means of which the layout table and plate holder may be moved quickly.

If desired, a gear wheel 158 may be mounted on the end of shaft 145 and a counter mechanism 159 positioned in cooperative engagement therewith, whereby the number of 15ths traversed by the layout table and plate holder may be totalled.

In the operation of the present invention, if the letter "P" in a particular style is desired to be photographically fixed upon a sensitized sheet, the elevator 14 upon which the dials 5 are mounted is vertically positioned to selectively bring any one of three annular rows of dials 5 into horizontal plane alignment with the photographic axis of the camera unit 7. It should be noted that each one of these annular rows of dials 5 bears a different set of characters. For instance, the top row may have dials bearing capital letters; the second row may contain dials having lower case letters designated thereon; and the bottom row may indicate numbers and miscellaneous characters. Therefore, if it is desired to photographically fix the letter "P" in capital letters, the elevator 14 is vertically disposed to bring the top annular row of dials 5 into horizontal plane alignment with the axis of the camera. This selective vertical movement of the elevator 14 is effected through the manipulation of the lever 126 as has heretofore been described.

After the style of the letter has been selected, the letter "P" is dialed through the rotation of the handle 65 until the pointer 64 is in register with the letter "P" mounted on the frustum conical ring 58. The member which is received in the milled slots 60 and which bears the characters or letters has indicia associated therewith which correspond to the characters on the dials 5. These indicia may be arranged in sets, each of which corresponds to a set of characters designated in a vertical row of dials 5. For instance, there may be a letter "P" on top of the ring 58, a letter "p" below that, and the character "2" at the bottom. In this manner the pointer 64 is in indicative relationship with all of said indicia at the same time.

The aforesaid operation of dialing the letter "P" would bring into photographic range of the camera unit 7 the corresponding character disposed in the top annular row of dials 5. The image of the letter 'P'" would be reflected from the surface of the shutter 92 onto the layout table 92'. This layout table 92' and the plate holder 115 are mounted in such relative positions that the position of the image of the letter "P" on said layout table 92' corresponds to the projectable position of the image of said letter on the sensitized film.

The table 92' can be translated so as to project the image of the letter "P" on any predetermined transverse portion of said table. This translation is effected by means of the manipulation of the crank 157 which rotates the shaft 150, bevel gears 153 and 154 and the feed screw 120. This, as already described, will effect the translation of the layout table 92' in a direction of the feed screw 120. This translation of the table 92' through the agency of the metal tape 118 effects the corresponding vertical displacement of the plate holder 115.

To effect the projection of the image of the letter "P" onto a longitudinal predetermined portion of the layout table 92', the crank 77 is manipulated. The rotation of this crank 77 is transmitted to the shaft 78, links 79, 80 and 81 to the brackets 3 whereby the rollers 71 and 75 are moved over their respective tracks. This effects the horizontal displacement of the drum 4 with its associated camera unit 7, the connection between the camera unit 7 and the casing of the plate holder 115 being constructed to permit such relative movement. During this operation, the layout table 92' is stationary so that the image of the letter "P" can thereby be selectively projected onto any longitudinal portion of said table.

After the position of the letter "P" has been determined on the layout table 92', the shutter 92 is angularly displaced outside the photographic range of the camera and the image "P" photographically fixed upon the sensitized sheet. The shutter 92 is then restored to its normal position (shown in Figure 1) preparatory to subsequent operations.

Figure 8:
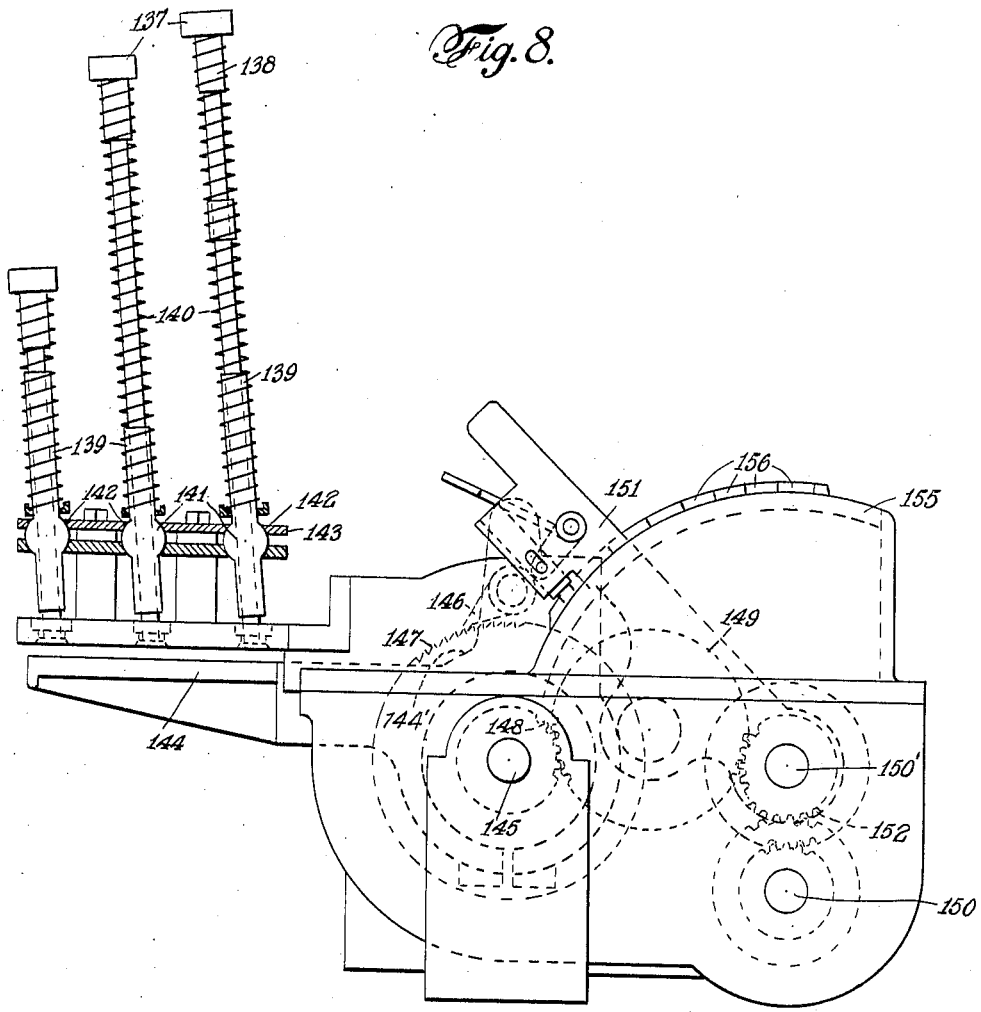
Figure 8 is a side elevation of Figure 7, the keys being shown in section.

Suppose it is desired to photographically fix the letter "A" adjacent the letter "P" so as to form part of a related composition. Then this letter "A" is dialed through the manipulation of the handle 65 as already described so as to bring the corresponding dial 5 into photographic range of the camera unit 7. This letter "A" will be projected in superimposed relationship with respect to the previous position of the letter "P" on the layout table 92'. To obtain the proper justification between the letters in order to obtain the desired artistic effect, any one of the keys 137 corresponding to the width of the letter is impressed. As already described, the letters of the alphabet, in accordance with the system employed in the present invention, are keyed in 15ths so that such designations indicate the number of 15ths each letter should be moved when made in combination with other letters in order to give proper artistic spacing. Suppose the number "14" has been assigned to the letter "A" in accordance with a chart or other indicating means. The key 137 having the number "14" thereon (as seen in Figure 7) is depressed to extreme downward position. The extent of the depression of said key 137 is determined by the length of the member 138 as well as the length of the tube 139. The depression of the key 137 causes the end of the member 138 to engage the arm 144 of the bell-crank 144' and effects thereby a counterclockwise rotation of said bell-crank, as seen in Figure 8. It should be noted that the degree of angular rotation of said bell-crank varies in accordance with the particular key 137 depressed and correspondingly varies, therefore, in accordance with the selective amount of justification desired between successive letter imprints. The counterclockwise rotation of the bell-crank 144' causes a corresponding rotation of the pivotally mounted pawl 146 on said bell-crank. As already described, the pawl 146 is normally in engagement with the ratchet 147 fixed to the shaft 145 so that corresponding rotational movement to said shaft is imparted. As already described, this rotational movement of the shaft 145 is transmitted through the agency of a suitable reducing mechanism to the screw member 120, thereby effecting a corresponding movement of the layout table 92'. The displacement of the table 92' will correspond in amount to the particular key 137 depressed, and the image of the letter "A" on the layout table 92' will be sufficiently displaced from the position of the previous image "P" to effect proper justification. The displacement of the table 92' will cause a corresponding vertical displacement of the plate holder 115 so that the sensitized sheet thereon will be in position to receive the impression of the letter "A".

If desired, justification between successive characters may be effected through the manipulation of the crank 157. In that case, the position of the successive characters may be determined in accordance with a predetermined layout, or the outline of successive letters may be recorded upon a layout sheet secured to said layout table and the degree of justification determined by the operator as the images are projected adjacent the previous recorded images.

Since it is obvious that various modifications may be made in the apparatus above described, I do not intend to limit myself to the exact details above described except as defined in the following claims.

I claim:

1. A photographic composing machine comprising a drum having an opening therein, a shaft extending through said drum, means to rotate said shaft, a tubular shaft encasing the first named shaft, means connecting said shafts whereby the rotation of the first named shaft is transmitted to the said tubular shaft, an elevator loosely mounted on said tubular shaft, a plurality of annular rings carrying master characters mounted on said elevator, and means for imparting the rotation of said shafts to said rings.

2. A photographic composing machine comprising a drum having an opening therein, a shaft extending through said drum, means to rotate said shaft, a tubular shaft encasing the first named shaft, means connecting said shafts whereby the rotation of the first named shaft is transmitted to the said tubular shaft, an elevator loosely mounted on said tubular shaft, a plurality of annular rings carrying master characters mounted on said elevator, means for imparting the rotation of said shafts to said rings and means to raise or lower said elevator and rings.

3. A photographic composing machine comprising a drum having an opening therein, a shaft extending through said drum, means to rotate said drum, a tubular shaft encasing the first-named shaft, means connecting said shafts whereby the rotation of the first-named shaft is transmitted to the said tubular shaft, an elevator loosely mounted on said tubular shaft, a plurality of annular rings carrying master characters mounted on said elevator, means for imparting rotation of said shafts to said rings, means to raise or lower said elevator and rings, and means to maintain the elevator in adjusted position.

4. Means for use in a photographic composing machine comprising an annular member having a plurality of openings therein, master characters positioned in said openings, and a keyway in the inner periphery of said annular member.

5. Means for use in a photographic composing machine comprising a plurality of superposed annular rings having master characters on the periphery thereof, each of said rings being provided with a keyway, and means disposed in said keyways to secure the rings together.

6. A photographic composing machine comprising means to position selected characters in projecting position, a layout table, a holder adapted to carry a sensitized medium, means to selectively project images of the selected characters on the layout table and sensitized medium, and a member connecting said table and holder whereby movement imparted to said table is transmitted to said holder.

7. A photographic composing machine comprising means to position selected characters in projecting position, a layout table mounted in a horizontal plane, a holder adapted to carry a sensitized medium at right angles to the table, means to selectively project images of the selected characters on said layout table and said sensitized medium, means to move said table and a tape connecting said table to said holder whereby the holder my be correspondingly displaced in a vertical direction.

8. In a photographic composing machine a layout table on which successively selected images are projected, a plurality of keys, each of which is separately adapted to be depressed in accordance with the desired positioning of the successive images projected on the table, and means to translate the motion of the keys to the table.

9. In a photographic composing machine a layout table on which successively selected images are projected, a plurality of keys, each of which is adapted to be separately depressed in accordance with the desired positioning of the successive images projected on the table, an arm adjacent the lower portions of keys and adapted to be moved when a key is depressed, and means to translate the movement of the arm to the layout table.

10. In a photographic composing machine a layout table on which successively selected images are projected, a plurality of keys, each of said keys being adapted to be separately depressed in accordance with the desired positioning of the successive images projected on the table, each of said keys being provided with a stop which limits the downward movement thereof, and means to translate the motion of each key to the table.

ASHLEY G. OGDEN.